United States Patent
Sluijter et al.

(10) Patent No.: US 8,703,757 B2
(45) Date of Patent: Apr. 22, 2014

(54) SEED TREATMENT WITH PRF

(75) Inventors: Menno Emanuel Sluijter, Lucerne (CH); Alexandre Jose Leonardo Teixeira, Oporto (PT)

(73) Assignee: UTOPS B.V., Amsterdam (NL)

( * ) Notice: Subject to any disclaimer, the term of this patent is extended or adjusted under 35 U.S.C. 154(b) by 1130 days.

(21) Appl. No.: 12/525,534

(22) PCT Filed: Feb. 1, 2008

(86) PCT No.: PCT/NL2008/050059
§ 371 (c)(1),
(2), (4) Date: Jan. 19, 2010

(87) PCT Pub. No.: WO2008/094042
PCT Pub. Date: Aug. 7, 2008

(65) Prior Publication Data
US 2010/0235949 A1    Sep. 16, 2010

(30) Foreign Application Priority Data
Feb. 1, 2007 (EP) ..................... 07101545

(51) Int. Cl.
*A61K 31/545* (2006.01)
(52) U.S. Cl.
USPC ....................................... 514/200
(58) Field of Classification Search
USPC ....................................... 514/200
See application file for complete search history.

(56) References Cited

U.S. PATENT DOCUMENTS 6,303,166 B1   10/2001   Kolbe et al.

FOREIGN PATENT DOCUMENTS

| FR | 2 594 292 | | 8/1987 |
|---|---|---|---|
| FR | 2798252 A1 | * | 3/2001 |
| RU | 2340139 C2 | * | 12/2008 |
| RU | 2340165 C1 | * | 12/2008 |
| WO | WO 9501090 A1 | * | 1/1995 |
| WO | WO-02/39786 | | 5/2002 |
| WO | WO 2007132003 A1 | * | 11/2007 |

OTHER PUBLICATIONS

Bokka et al. "Pulsed Electric Field Effects of the Germination Rate of Yellow Nutsedge Seeds". 9781-4244-4065-8/09 pp. 962-964 2009.*
Goel et al. Pulsed Electric Field: Annual Report—Conference on Electrical Insulation and Dielectric Phenomena 2003 (56-59) Sep. 7, 2004 Abstract.*
Zenchenko, V. A. "polarographic study of the effect of light-pulsed irradiation of pea seeds on the mitochondrial respiration of shoots" Svetoimpul'snaya Stimulyatsiya Rast. (1971) Meeting Date 1969, 114-28 Abstract.*
Seo et al. "Influence of pulsed electric filed on growths of soil bacteria and pepper plant." Korean J. Chem Eng. 27(2), 560-566 (2010).*
Kalinin et al. "Effect of law and high-frequency electromagnetic fields on seeds" Biofizika (2005) 50(2), 361-366 Apr. 27, 2005. Abstract.*
He et al. "Preliminary study of the physiological effect of magnetic field pretreatement on wheat" Shengwu Huaxue Yu Shengwu Wuli Jinzhan (1983) 52, 45-6 Abstract May 12, 1984.*

(Continued)

*Primary Examiner* — Wendy C Haas
(74) *Attorney, Agent, or Firm* — Morrison & Foerster LLP

(57) ABSTRACT

The invention relates to a method to enhance germination of seeds and/or growth of plants or plant parts and/or plant yield by subjecting seeds to a pulsed radiofrequency electrical field (PRF).

13 Claims, 16 Drawing Sheets

(56) References Cited

OTHER PUBLICATIONS

Wikipedia "Atmospheric Electricity" available at http://en.wikipedia.org/wiki/Atmospheric_electricty accessed Sep. 19, 2012.*

Slater et al. "Electromagnetic Field Study" Oregon Wave Energy Trust Sep. 30, 2010.*

International Search Report for PCT/NL2008/050059, mailed on May 13, 2008, 3 pages.

International Preliminary Report on Patentability for PCT/NL2008/050059, issued Aug. 4, 2009, 8 pages.

* cited by examiner

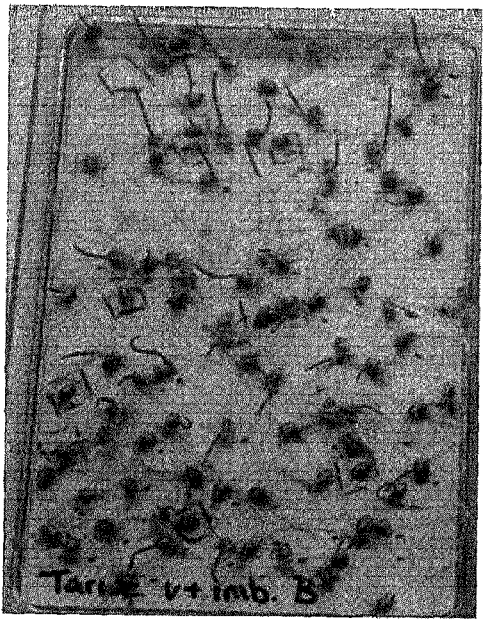 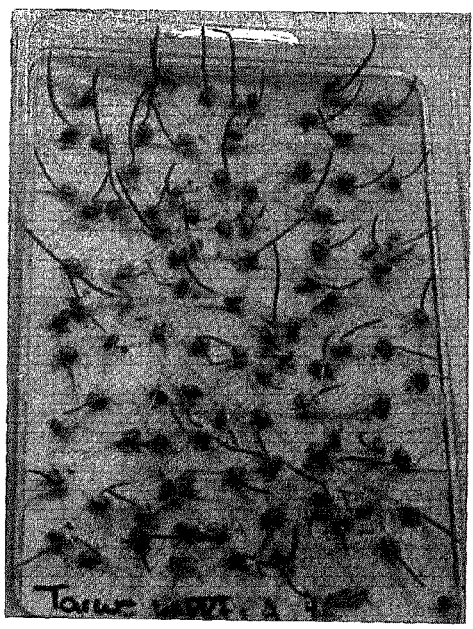
Fig 15　　　　　　　　　　　　Fig 16
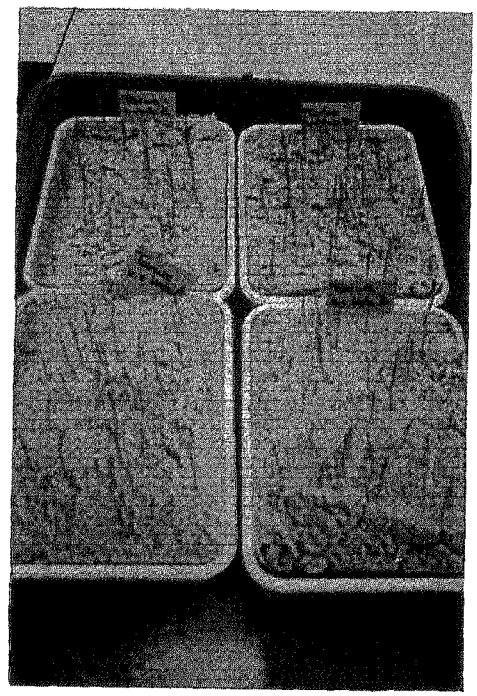 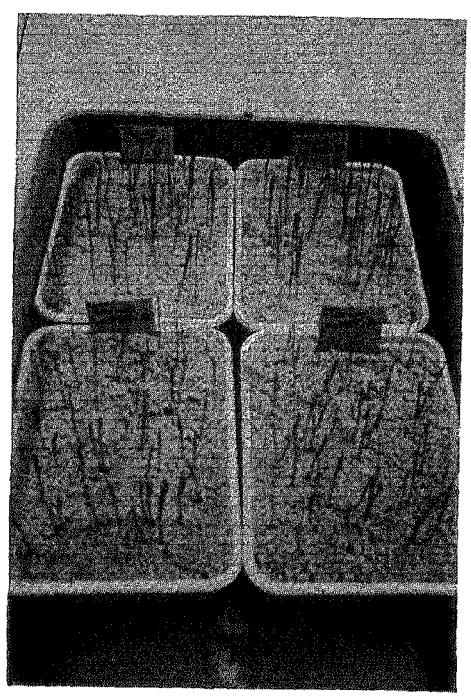

SEED TREATMENT WITH PRF

CROSS-REFERENCE TO RELATED APPLICATIONS

This application is the national phase of PCT application PCT/NL2008/050059 having an international filing date of 1 Feb. 2008, which claims benefit of European application No. 07101545.7 filed 1 Feb. 2007. The contents of the above patent applications are incorporated by reference herein in their entirety.

The invention relates to the field of agriculture, more specifically to the field of seed treatment and seed germination, and even more specifically to the use of electrical fields for the enhancement of seed performance.

DESCRIPTION OF THE BACKGROUND

Seeds are one of the most important tradable assets in agriculture. Seeds are of such a small volume, that they can be easily stored and transported; yet they represent an enormous value for the grower since they can develop into mature plants by simply growing them under the appropriate conditions. However, since growing of plants (crops) from seeds also needs to be done in a cost-efficient fashion, the quality of the seeds and the biological process of sprouting should be as optimal as possible. One of the factors that needs to be controlled is the timing of germination of the seed, since this determines the timing of harvest. For production of crops, it is essential that the growth of all plants occurs simultaneously, to provide for a uniform product and to economize the growing of the plants and the harvesting of the crops. One of the ways to achieve this, is to prime the seeds.

Priming mainly concerns pre-treatment of the seeds to provide water in a controlled manner. This will initiate early stages of germination, but does not permit radicle protrusion. After priming the seeds are dried again. Later on, after sowing and exposure to water these primed seeds germinate faster, and seedling emergence is synchronised. Benefits of priming are a higher germination percentage (called 'germination capacity"), while seeds also may germinate faster (called "germination energy"). In addition, the uniformity of seedling emergence is enhanced. Different priming methods are known, such as osmo-priming (using liquid carriers of water), matrix priming (using solid water carriers) or hydro priming (using pure water).

Use of electric or electromagnetic fields to influence the growing characteristics of plants has occasionally been investigated since the first days of the electric age. Although many, often anecdotic and fragmentary experimental data are available, the results of those experiments are not univocal. One of the reasons is that there are many experimental parameters which can be varied, such as the type of field (magnetic, electromagnetic, electrostatic, electric, AC or DC, and even plasma fields), the strength of the field (or the distance to the source of the field), the frequency (in case of AC fields), the duration of the treatment, the type of plant or plant part that is treated, influence of other environmental conditions, and the like. In general, it can be said that many investigators have found beneficial effects on growth rates, yield size and quality by applying these kind of fields, although also no effects or even deteriorating effects have been reported. Also, in some field experiments, the beneficial effect can have been established by the fact that the applied fields were harmful for pathogens of the plants and that thus the plants could grow unhindered by disease (such as presumed in WO 02/39786).

Recently, some more serious investigations into the role of these kinds of energy fields in agriculture have been published. Ark, P. A. and Parry, W. (Quart. Rev. Biol., 1940, 15(2):172-191; see also U.S. Pat. No. 2,308,204) focused on the use of high-frequency electrostatic fields in agriculture for eradication of plant pathogens, such as fungi and nematodes. A similar application has been recently described by Cwiklinski, C. and von Hörsten, D. (ASAE Annual Meeting, 2001 paper #01671), Nelson, S. O. et al., (Trans. ASAE, 2002, 45(6):1937-1942), and by Wayland, J. R. (U.S. Pat. No. 5,060,414).

UHF electromagnetic fields have been reported to be phytotoxic (Davis, F. S. et al., 1973, Nature 242:291-292). However, also beneficial effects on germination and growth have been reported recently by Celestino C. et al. with a 50 Hz electromagnetic field on *Quercus ruber* seeds (Electro- and Magnetobiology, 2000, 19:115-120), by Moon, J-D. and Chung H-S. with various AC electric and magnetic fields on seeds of tomato (J. Electrostatics, 2000, 48(2):103-114), with a pulsed electromagnetic system on sprouted seeds and beans in a press release of EarthPulse Technologies LLC (Bengalore, India, Apr. 11, 2006), by Kalinin, L. G. et al. with a low-frequency pulse electromagnetic field on various kinds of seeds (Biofizika, 2005, 50(2), 361-366), and by Lynikiene, S et al. with a corona discharge field on carrot, radish, beet and barley seeds (Int. Agrophysics, 2006, 20:195-200). U.S. Pat. No. 5,740,627 describes the use of 'avalanches of ion-electrons' for treating seeds, especially tomato seeds, which causes enhanced growth characteristics of plants emerging from those seeds.

WO 02/39786 describes application of radiofrequency fields to biologic tissue and food in order to provide thermal energy by which micro-organisms are killed. This document also shows the treatment of plants and plant parts and shows that these plant demonstrate improved growing characteristics due to the absence of (pathogenic) micro-organisms.

One of the main disadvantages of the above described methods using electrical fields is that most of them use high to very high voltage electric fields, which of course implies a danger for the operators performing the treatment and which can detoriate the biological material that is treated. Especially in the cases where heat is generated by applying the electrical field the implicit damaging of cells jeopardizes a widespread use of these kinds of fields.

SUMMARY OF THE INVENTION

The inventors now have found that application of pulsed radiofrequency electric fields to seeds enhances the germination speed, the germination capacity of said seeds, increases the homogeneity of the sprouting process, and further enhances the rate of growth of the plantlets, without generation of heat that can damage the biological material. Further, the invention comprises a method according to the invention, wherein seeds are primed during or before PRF treatment. Preferably the seeds or plant parts are placed between a plate electrode and a ground plate.

In a preferred embodiment the parameters of the PRF are as follows:

Frequency: 50,000-1,000,000 Hz, preferably 150,000-500,000 Hz

Pulse duration: 0.1-100 msec, preferably 5-20 msec.

Pulse frequency: 1-20/sec, preferably 1-3/sec

Voltage: 1-100 V per cm distance between electrodes

Treatment time: 2-180 minutes

Preferably the voltage is 5-50 V per cm, More preferably 10-30V per cm. Also preferably the treatment time is between about 5 to about 60 minutes, more preferably between about 10 to about 30 minutes.

The invention further encompasses the use of PRF for enhancing germination of seeds and/or growth of plants or plant parts and/or plant yield.

Another embodiment of the invention are the seeds treated according to the method of the invention and the plants emerging from those seeds.

BRIEF DESCRIPTION OF THE FIGURES

FIG. 15 Photographs of imbibed, non-PRF treated wheat seeds. Bottom picture: 'angle' view of the 4 testpots (all repeats of the treatment control+imbibed). Top picture: top view of the foremost right pot of the bottom picture (pot B).

FIG. 16. Photographs of PRF1 treated wheat seeds. Bottom picture: 'angle' view of the 4 testpots (all repeats of the treatment PRF1: 23V/cm, 20 min). Top picture: top view of the foremost left pot of the bottom picture (pot A).

DETAILED DESCRIPTION OF THE INVENTION

Figure 1:
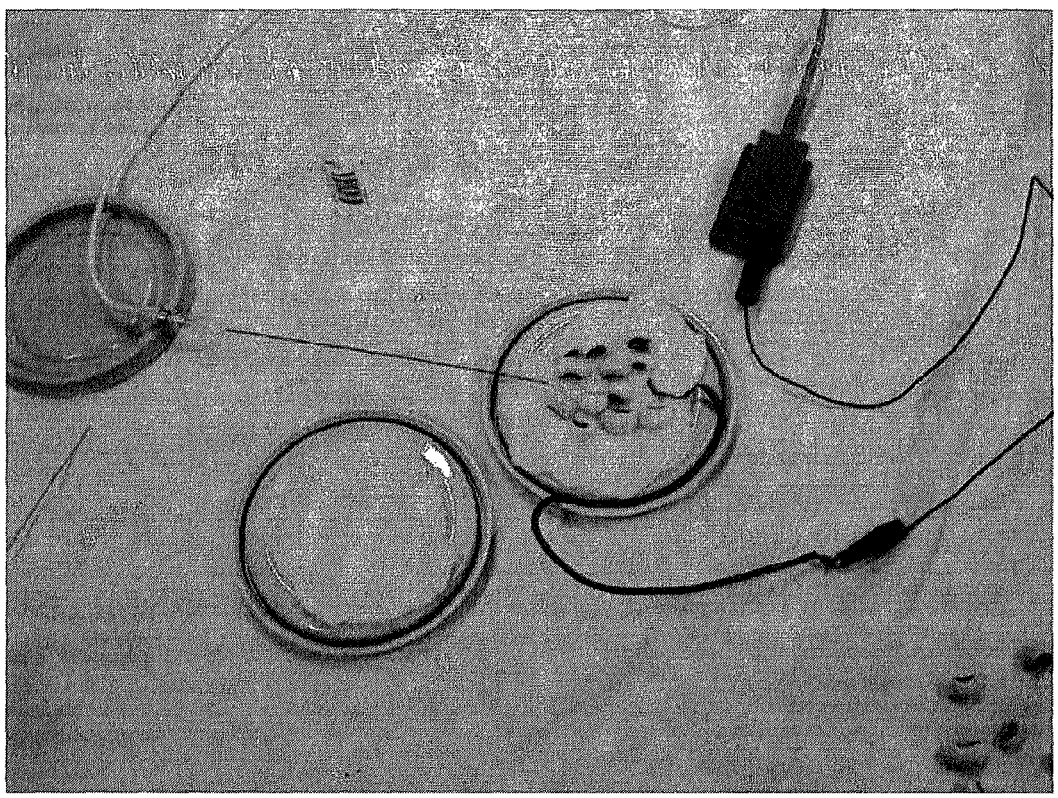
FIG. 1 shows a set-up of the experiment of Example 1. 12 beans are placed on a wet tissue in a Petri dish and PRF stimulated by an electrode that is placed parallel to the long axis of the bean. Connection to earth is by a plate electrode placed underneath the wet tissue.

PRF (pulsed radiofrequency) is used in medicine as a clinically proven method to alleviate pain in cases where pain sensation is due to or transported via peripheral nerves (such as in case of pain caused by pinching a nerve by a slipped disc of the spinal column, facial pain, trauma, etc.). PRF, just like RF, works through applying an electrical AC current to the vicinity of a nerve. Usually a frequency of 400,000-500,000 Hz is used, but the range may vary from 50,000 to 1,000,000 Hz. With PRF, current is delivered in pulses of short duration (1-100 msec) separated by a silent period of about 0.1 to 1 sec. In PRF, in contrast to continuous RF, the heat that is generated at the tip of the electrode during the active phase of the duty cycle is dissipated during the resting phase of zero, or of appreciably lower voltage. It is allowable that the temperature may briefly rise with up to 5° C. during the active phase of the duty cycle (the so-called heat spikes), although the biological effects of these ultrashort and moderate rises in temperature are not known. Furthermore, the spread of heat during a heat spike has been predicted to be minimal (<0.2 mm in human tissue), thereby practically outruling that a thermal effect occurs. As for yet, there is no conclusive theory explaining and supporting the observed clinical effects of PRF.

Continuous Radiofrequency (RF) electrical fields have been applied to seeds as described in U.S. Pat. No. 2,712,713 and to plants as described in WO 02/39786. However, there it is indicated that the development of heat by application of the electrical field and thus an increase of the ambient temperature is an essential feature of the treatment.

Surprisingly now, it was found that PRF, i.e. pulsed radiofrequency electrical fields without or with minimal generation of heat, can also be used for enhancing germination and growth in plants. For this purpose plant parts, but especially seeds are treated with PRF. Treatment with PRF can be performed as described in the Examples, i.e. by placing seeds in a wet or moist environment, such as on a wet tissue and then applying the electric field through one or more electrodes that are placed close to the seed. Alternatively, it is possible to place the seeds into an aqueous solution such as an aqueous solution, such as normal saline as described in Example 2. PRF could then be applied through plate electrodes with a larger surface between which the seeds are placed (or transported). In both cases, a uniform treatment is easily obtainable. For this, a semi-automatic process is feasible in which the seeds are slowly transported on e.g. and endless conveyor belt, which passes between the electrode plate and the ground plate. When seeds are in an aqueous solution, it can be envisaged that this solution is led through a bath in which the electrode plates are situated, or, alternatively, in piping which is led through the electrode plates (in the latter case, the electrode plates are outside the aqueous solution).

As the Examples show, the optimal parameters, one of which is the time of the PRF treatment, is different for the various seeds treated. The passing should therefore take the intended time for treatment, or the conveyor belt (or aqueous stream) should be halted for a sufficient amount of time to perform the treatment.

Usual values are a frequency of about 300,000 Hz, a pulse duration of 10 msec and a pulse frequency of 2/sec There is however a wide variation in parameters that may be used:

Frequency: 50,000-1,000,000 Hz, preferably 150,000-500,000 Hz
Pulse duration: 0.1-100 msec, preferably 5-20 msec.
Pulse frequency: 1-20/sec, preferably 1-3/sec
Voltage: 1-100 V per cm distance between electrodes
Exposure time: 2-180 minutes Especially the applied voltage and the time of the treatment are parameters which should be adjusted to achieve the optimal treatment. Preferably, the voltage is between about 5 and about 50 V/cm, and more preferably between about 10 and about 30 V/cm. The treatment time is preferably about 5 to about 60 minutes, more preferably about 10 to about 30 minutes. As is shown in the Examples, we have found that the optimal treatment parameters with respect to voltage and treatment time differs between the seeds of various species (see Table 1 and Figs. A and B). From this it appears that in some cases (e.g. Zinnia) the optimum lies with a low value for voltage and time and that an increase in these parameters decreases the effects on seed germination, while in Bellis a longer duration of the treatment appeared to be optimal.

These differences can be explained through the differences in size of the seeds and/or the thickness of the hull of the seed, but the major factor appears to be the water content of the seeds. It appears that PRF has no or only little effects if the seeds are completely dry, and PRF effects appear to be showing from a water content of at least 0.1% (based on the dry weight) on. The upper limit of the water content does not seem critical, but it is expected that seeds with a water content up to 60% would be treatable. Preferred is a water content of about 30-40% (based on dry weight).

One of the ways that water can be provided to the seeds is by first priming them in an aqueous solution, like saline or a solution of an electrolyte (e.g. 0.1-0.5% $KNO_3$). It is possible, as is done with commercially priming of seeds, to store the seeds after imbibition of the aqueous solution. In our experiments it appears that a storage of 7 days did not diminish the beneficial effect of PRF on the germination of said seeds.

Another way to provide the water is to provide a spray which nebulizes the aqueous solution on the seeds, either before or during the PRF treatment.

Further the duty cycle of the PRF treatment may be irregular, with varying pulse duration and pulse frequency, and the voltage may not be brought back to zero during the rest phase.

The RF Lesion Generators that are commercially available are suitable for performing the present procedure.

After treatment the seeds can be stored, but it is preferable to keep this storage as short as possible. An optimal effect is achieved by treating the seeds with PRF during or shortly after priming of the seeds, which in general means that the seeds are sown shortly after treatment (within 1-2 days). It is also possible to repeat the PRF treatment after the seeds have been stored.

The invention is ideally suited for seeds, but also other plant parts can be treated, such as (potato) tubers, flower or onion bulbs, developing fruits or nuts, and even complete seedlings or whole plants. Of course, treatment of these plant parts will necessitate adaptation of the size of the electrodes and the parameters of the PRF treatment. However, such is well within the capabilities of the person skilled in the art.

The effects of the treatment first of all show in the germination. Germination will occur in a larger percentage of the seeds as compared to controls, and it will take place sooner after sowing of the seeds. This also implies that PRF treatment can be a mechanism to ensure a more simultaneous emergence of the seedlings. Further, also the growth rate and vigour of the seedling is higher than in control seeds, which will result in healthier plants, which mature earlier and thus provide earlier blossom and/or production of biomass. Next to the speed of growth, the plants arising from PRF treated seeds are more vigourous, resulting in bigger plants (both in height and in diameter), and the yields (of e.g. biomass or fruits or seeds) thus are higher, which can be due to both an increase in number and in size of e.g. fruits.

Another possible use of the PRF treatment is for seeds which have become less usable, e.g. through ageing. As shown in the experimental section, it appears that the germination rate of these aged seeds can be restored to normal levels.

As already indicated earlier, the results shown in the Examples below indicate that different parameter settings are needed for the treatment of seeds of different species. A person skilled in the art will be well capable of finding the optimised parameters for seeds of those species that have not been shown in the examples.

As for yet, it is unclear why PRF treatment causes the above-mentioned effect. With RF treatment, it has been postulated, that an increase in temperature activates the metabolism in seed, thus giving a headstart for emergence (priming by heat). In U.S. Pat. No. 2,712,713 it is taught that there is no indication that the biomaterials contained in the seed specifically resonate with the applied radiofrequencies. Further, biochemical changes are found in the treated seeds, such as changes in carbohydrate content and species, and changes in fat content, although it can be argued that these changes are due to secondary processes from an activated metabolism. One possible hypothesis would be that during priming the membrane of the seed has become leaky (and after ageing it even has become more leaky) and that metabolites that are necessary for germination of the seed (like the glucose molecules, proteins and nucleic acids) disappear from the seed. PRF treatment now would be able to remedy the leakiness of the membrane, and even provide additional electrolytes like alkali ions and $NO_{3-}$ to the seed (if present in the aqueous solution in which PRF is performed), which have a fertilising function. According to this hypothesis, a preferred embodiment of the method of the invention is performing PRF in an aqueous solution in which electrolytes, especially $NO_{3-}$ and/or glucose have been added to the solution.

Thus, according to the invention, PRF treatment of seeds is a safe, economic and cost-effective way to enhance germination of seeds, either by increasing the rate of germination, the percentage of germinated seeds, or by improvement of the homogeneity of the germination process, and/or vigour and growth of plants or plant parts and/or plant yield.

Example 1

Beans were exposed to Pulsed RF electric fields as follows:
Beans (*Vigna unguiculata unguiculata*) were placed in a petri dish on a piece of cotton wool that was soaked in normal saline. The cotton wool was connected to the inactive (ground-) port of the lesion generator An SMK-C15 (20 G) canula (Cotop Int., Amsterdam, The Netherlands) with a sensing electrode in place served as active electrode. The active tip was held parallel to the bean and then softly pressed against it. 10 msec pulses were generated with a frequency of 2 Hz and a voltage of 70 V for a total exposure time of 10 minutes. There was no rise of the mean tip temperature during the procedure. The set-up of the experiment is shown in FIG. 1.

Figure 2:
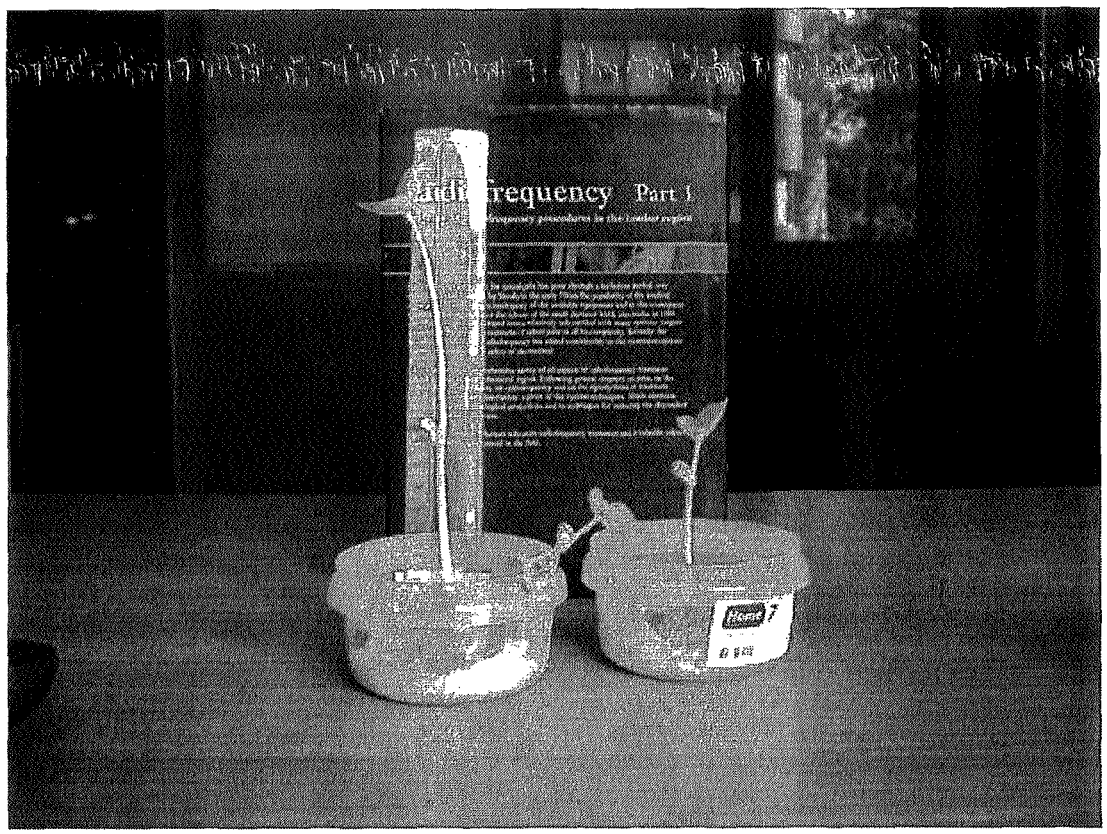
FIG. 2 shows the effect on growth on bean seedlings, stimulated according to Example 1. Left plant: stimulated. Right plant: control, not stimulated.

It was observed that after PRF treatment germination of the beans and growth of the seedlings was appreciably faster than with untreated controls (FIG. 2).

Example 2

A second experiment was carried out to get an indication of the optimal exposure time. The experiment was performed in winter time, under unfavourable circumstances for germination. Stimulation was carried out by placing the beans in a plastic container filled with normal saline, so that the beans were submerged in the solution. A conventional RF electrode was immersed into the solution as active electrode, the other electrode, also immersed, was a metal wire that was connected to the ground plate connection of the generator. The electrodes were 7 cm apart. PRF was applied with 10 msec pulse width and a frequency of 2 Hz, Voltage 70V.

Figure 3:
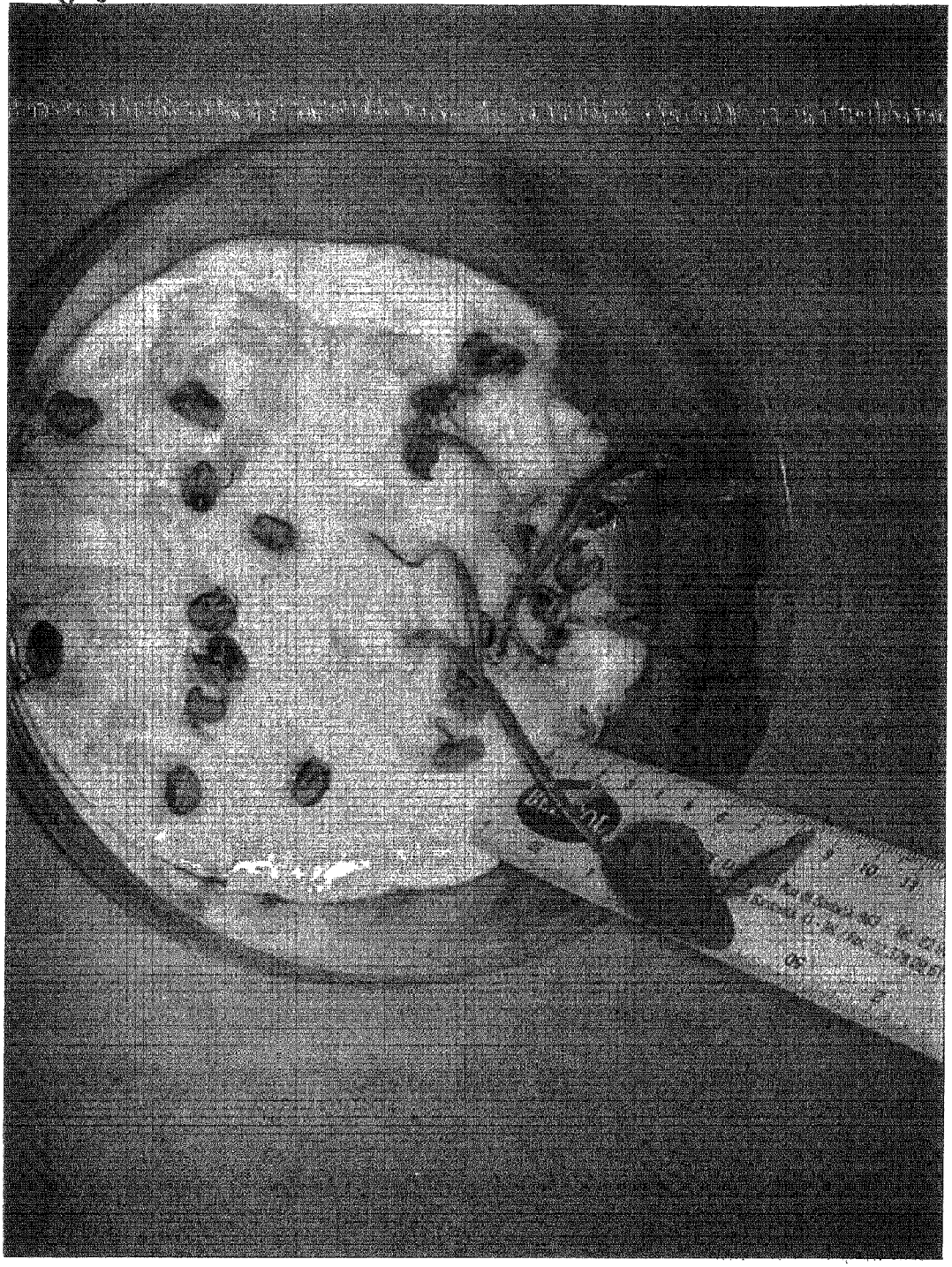
FIG. 3 shows the effect of exposure to PRF electric fields on germination of bean seeds. In front are ten beans that have been stimulated with PRF for 2 minutes. At the back are ten beans that have been stimulated with PRF for 10 minutes.

Ten RF exposed beans that had been exposed during 10 minutes and ten beans that had been exposed for two minutes were planted (method see Example 1). Out of the first group 6 beans germinated. Out of the second group none of the beans germinated (FIG. 3). This difference is statistically significant with a p-value of 0.0108 and an odds ration of 33.

Example 3

Description of the Methods

Figure 13:
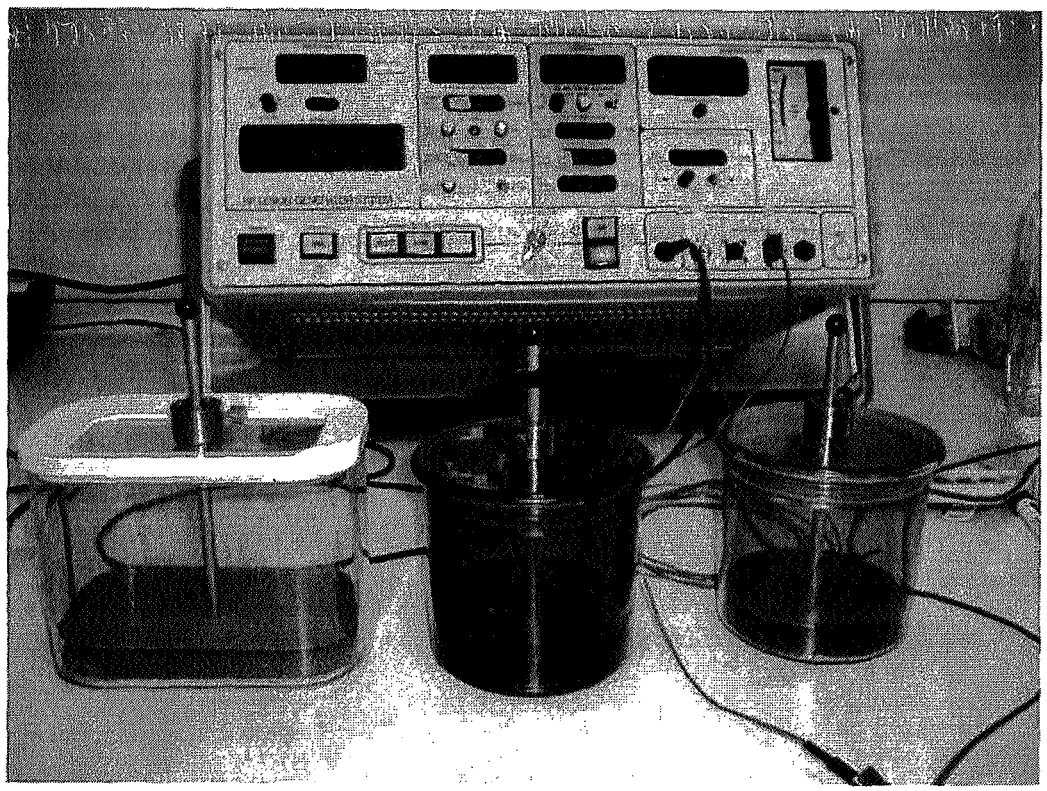
FIG. 13 View of the PRF generator and the pots used for PRF treatment of seeds.

We have used a generator type RFG-3C plus (see FIG. 13) with following settings:
Pulses of 2 Hz, pulse duration 10 ms. and using different voltages (between 15-35 V/cm) and various duration of the PRF treatment (between 10-30 minutes). Impedance of the used electrolyte solution (0.2% KNO3) was found to be ca. 22-27 Ohm.

PRF treatments were done in plastic containers with 2 electrode plates, which have 1.5 cm space between the upper and the lower electrodes.

The small container contains 150 ml of an electrolyte solution (e.g. 0.2% $KNO_3$) and the bigger container 250 ml.

Seeds were put into the space between the electrodes. Small seeds were put first into filter teabags, to avoid floating. Seeds should be well soaked in water or in the $KNO_3$ solution (the so called "imbibition"), before PRF treatment.

After the PRF treatment, seeds were transferred into a sieve, washed with water and used for germination experiments directly, or they were dried back during 3 days and used for the germination experiments 7 days later.

Germination tests were done in a professional germination climate chamber (with temperature control, under normal light/dark conditions). Seeds were germinated in sand, soil and/or on filter paper and the evaluations were carried out under normal practical and certified conditions, specific for the crop.

Observations were done starting at day 1 after the treatments up to 4 weeks, depending on the speed of germination of the specific crop.

Examples of Seed Treatments

Per seed treatment, preferably a minimum of 100 seeds were used, with at least 2-4 repetitions for each treatment.

The treatments were as follows (not all treatments were performed for every species tested):
1. Control: untreated seeds, no PRF treatment
2. Control "imbibition": seeds treated in water or the electrolyte solution (e.g. 0.2% $KNO_3$), but without PRF treatment
3. Control "Aged": seeds were physiologically aged by a pretreatment with high relative humidity (e.g. 70% RV) and at different temperatures (15-20° C.), for 1 week and subsequently treated at 45° C. for 72 hours, and no PRF treatment. The aged seeds have a lower germination rate (ca 60%) than the normal non-aged seeds (80-90%). We have used physiologically aged seeds in order to show the improvement of PRF treatment, which would be difficult to show in seeds which have already 80-90% germination.
4. PRF treatments: seeds were put into the containers with liquid 0.2% $KNO_3$ solution, and then treated with PRF. The applied voltage was varied between 15-35 V/cm and the duration was varied between 10 and 30 minutes.

Experimental Results and Observations

We have treated flower and vegetable seeds of different sizes, containing different storage components (starch or oil containing seeds) and seeds of different physiological stages: normal dry seeds, primed seeds (imbibed in saline solution), or physiologically aged seeds.

It was observed that in the treated seeds, there is a positive effect of PRF on the germination rate, the plant quality as well as homogeneity of the plants.

Also, improvement of seed germination and plant quality by using PRF has been shown in physiologically aged seeds, thus showing that PRF is able to repair the damages of ageing in such a way, that germination rates can be increased as well as the percentage of useful plants. This can be used to upgrade low germinating seed lots for commercial purposes.

These findings also support the idea that PRF treatment has no negative effects on germination or plant growth, when used in the optimal range and dosage, for the specific crop.

Experimental Results

*Zinnia elegans* seeds were treated with PRF in an electrolyte solution of 0.2% $KNO_3$, with different dosage (15, 23, and 33 V/cm) and with different treatment time (10, 20 and 30 minutes). As controls we have used normal dry seeds and seeds which have been imbibed in $KNO_3$ solution, but not treated with PRF.

These experiments showed a positive response on germination rate and plant quality with a PRF treatment of 20 minutes with 23V/cm.

Figure 14:
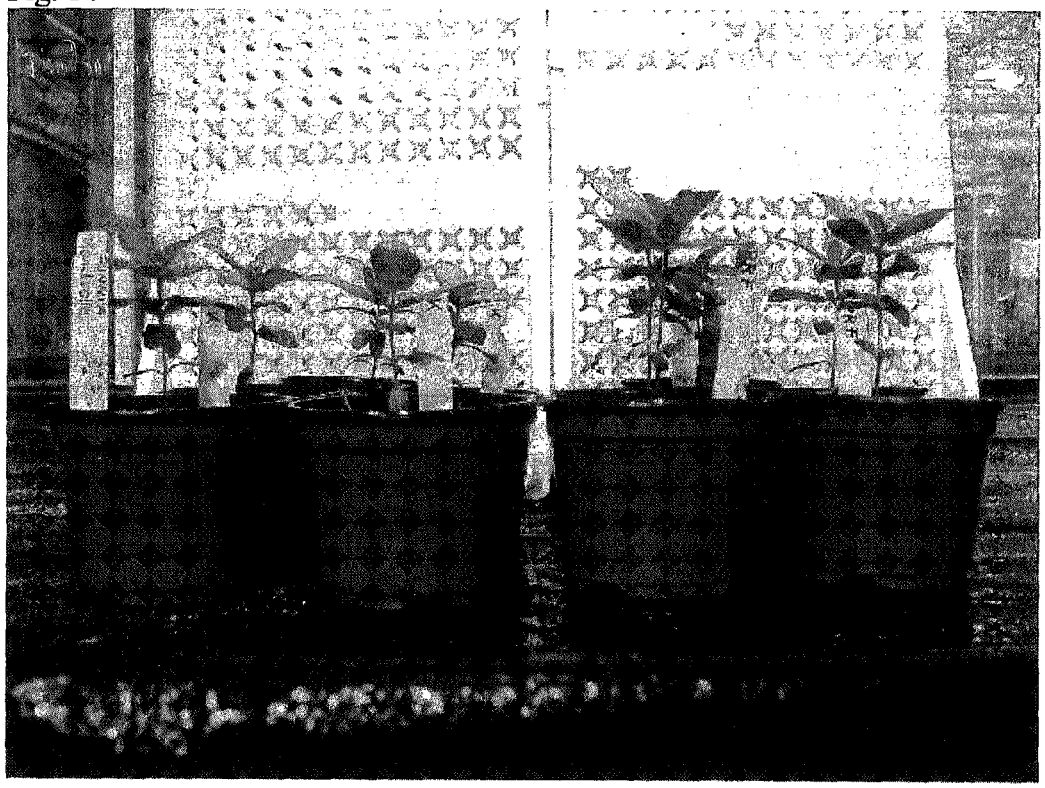
FIG. 14 Photographs of potted *Zinnia* plantlets. Left pair: control; right pair: PRF treated.
Figure 17:
FIG. 17. Photographs of *Zinnia* seeds germinating on paper. Left control, right PRF treated.
Figure 18:
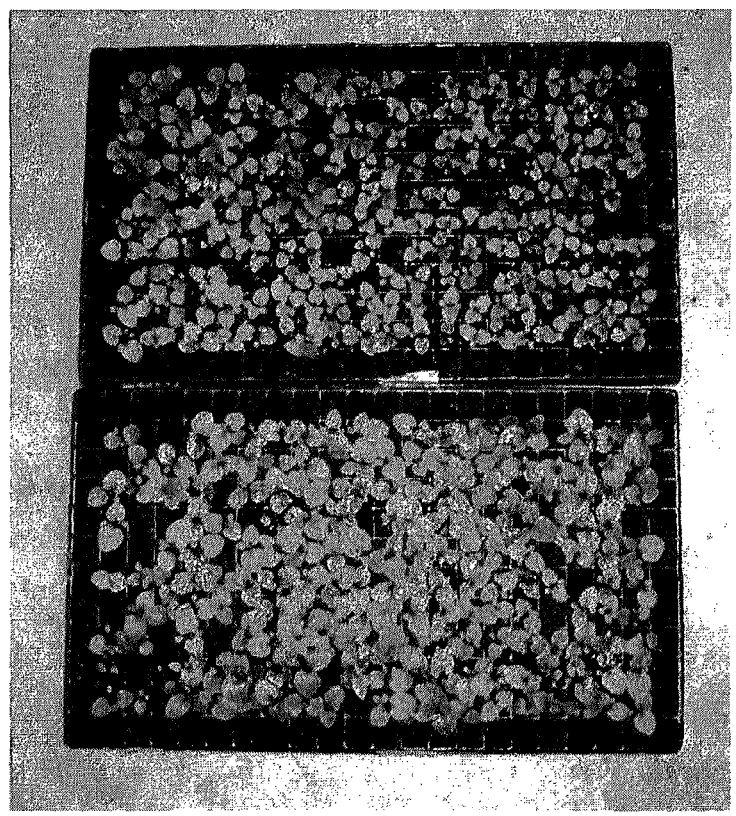
FIG. 18. Photographs of *Zinnia* seeds germinating in soil. Upper panel; control; lower panel: PRF treated.

PRF treated *Zinnia* seeds germinated faster and more homogeneous as was observed on paper trays as well as in soil (FIGS. 17 and 18). The resulting plants were 2-3 cm taller and showed bigger leaves and thicker stems, in comparison to the controls, which had the same treatment (imbibition in KNO$_3$), but without PRF (FIG. 14).

The roots of these plants seem to be longer and/or thicker, which can be the reason for the increase in growth.

Figure 4:
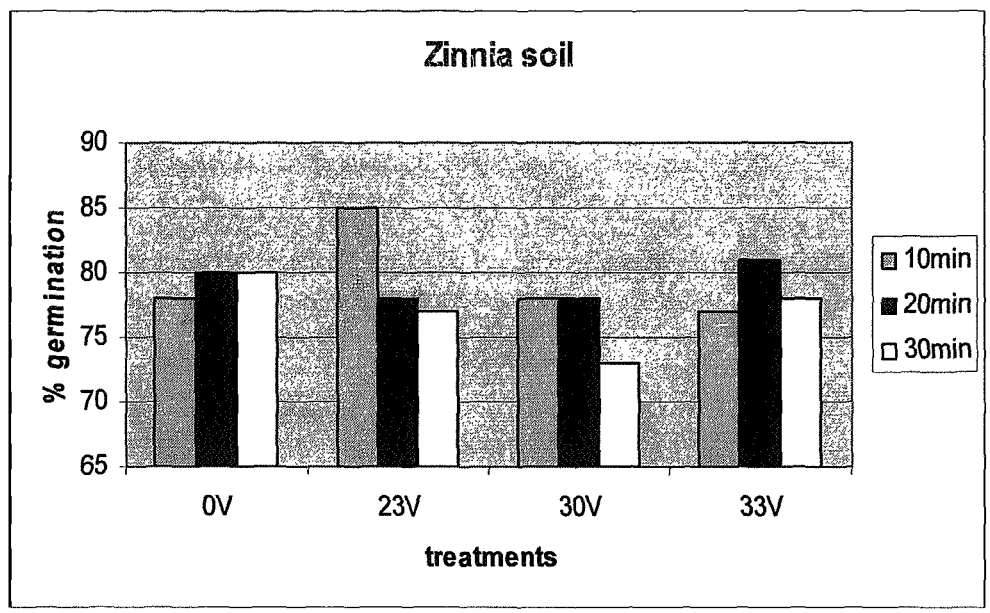
FIG. 4 shows the effects of different PRF treatments on the percentage germination in *Zinnia* seeds. Seeds were germinated on soil.

Several treatments have been performed, summarized in FIG. 4. There, it shows that the treatment of 23 V/cm during 10 min gives the best results for Zinnia (see also table 1)

Figure 5:
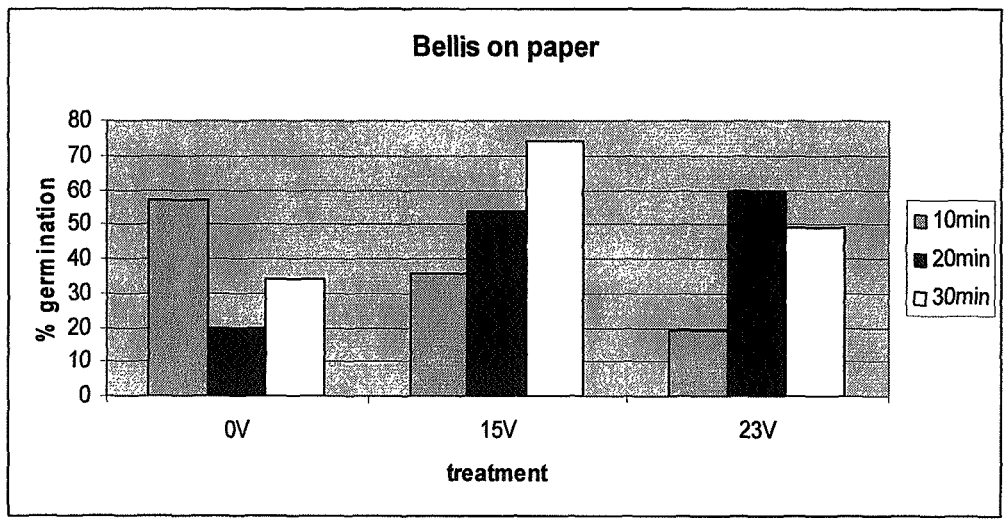
FIG. 5 shows the effects of different PRF treatments on the percentage germination in *Bellis* seeds. Seeds were germinated on wet paper.
Figure 19:
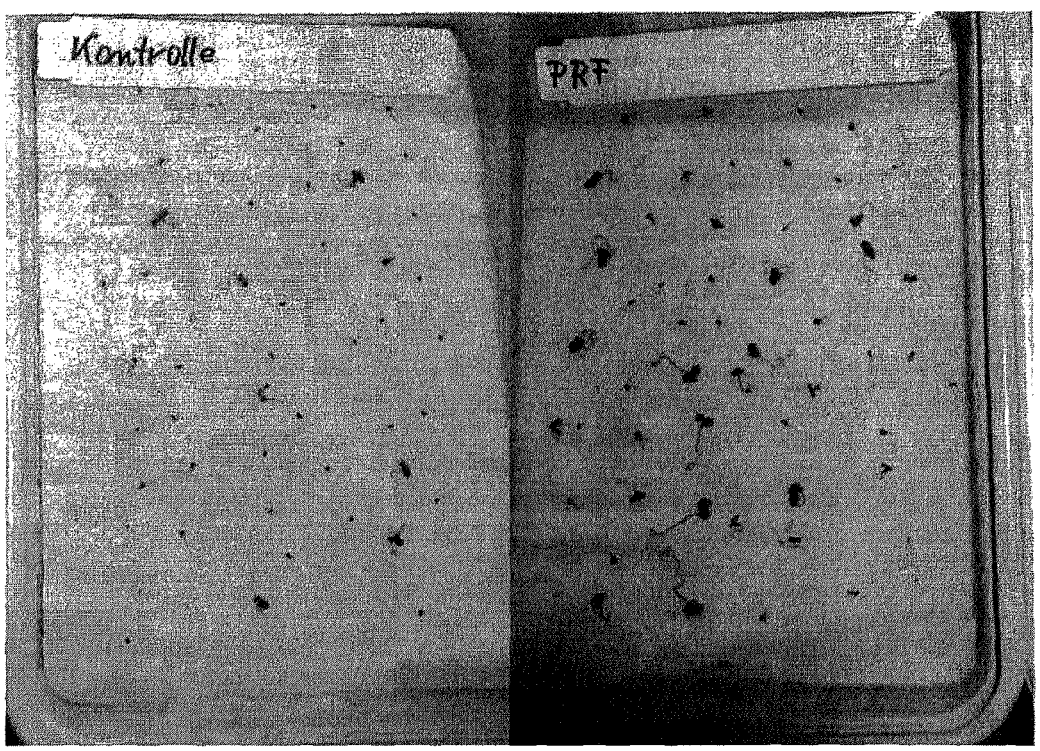
FIG. 19. Photographs of *Bellis* seeds germinating on paper. Left control, right PRF treated.

In another flower crop, Bellis perrenis (English Daisy), the PRF treatment (30 min. 15V/cm) has led to a higher germination rate than the controls (FIG. 5 and FIG. 19).

Figure 20:
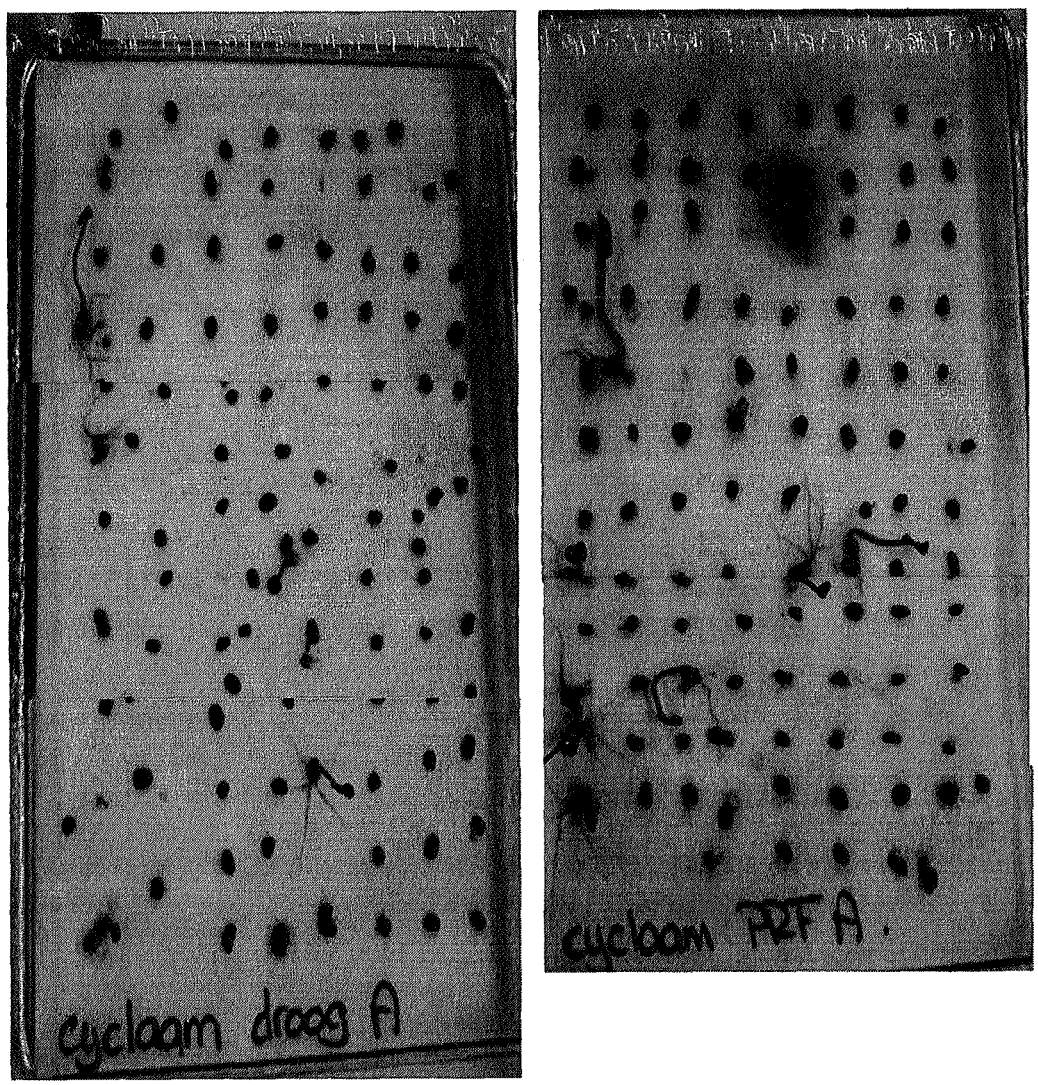
FIG. 20. Photographs of *Cyclamen* seeds germinating on paper. Left control, right PRF treated.

In Cyclamen (Cyclamen persicum), a PRF treatment of 20 minutes at 15 V/cm resulted in an increased germination frequency (FIG. 20).

Figure 6:
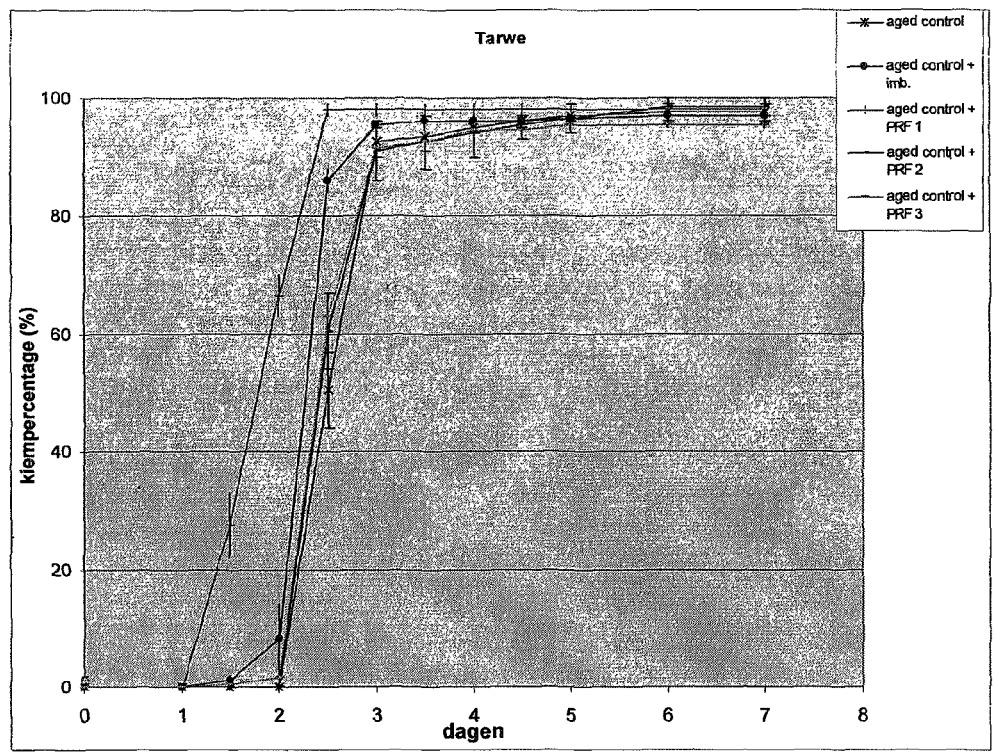
FIG. 6 is a graph of the germination rate of wheat seeds. On the y-axis the percentage germination is shown, while the X-axis gives the days after sowing.
Figure 7:
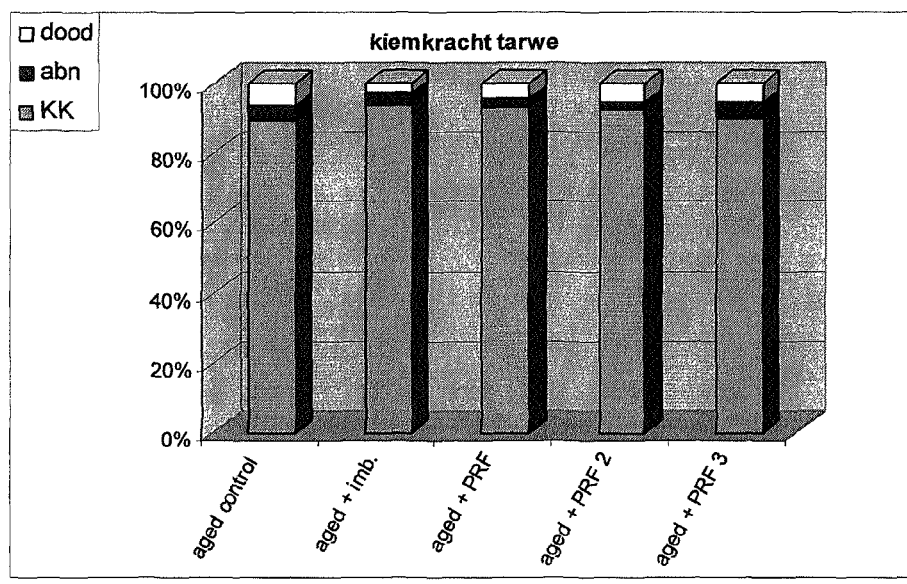
FIG. 7 demonstrates the effect of the different treatments as described in the examples on the germination of aged wheat seeds. Licht gray are normal plantlets, dark grey abnormal plantlets and white are dead plantlets.

In wheat (Triticum), a starch containing seed crop, we have treated physiologically aged seeds with PRF and saw that the speed of germination and the maximum germination capacity were increased, after PRF treatment with a dosage of 23V/cm during 20 minutes (FIGS. 15 and 16; treatment PRF2, FIGS. 6 and 7). The treatments with 23V, 20 min (PRF) and 33V, 20 min (PRF2) gave impaired results as compared with the control seeds. The seedlings emerged 1 day earlier than the physiologically aged controls, so that they reached the maximum germination (98%) already at the date that the control just started to germinate. Since the PRF treated seeds reached a higher germination percentage as the controls, it means that PRF can induce a repair mechanism to compensate the effect of ageing of seeds.

The figures show the difference in germination of physiologically aged seeds with PRF treatment and its control. (FIGS. 6 and 7)

Figure 8:
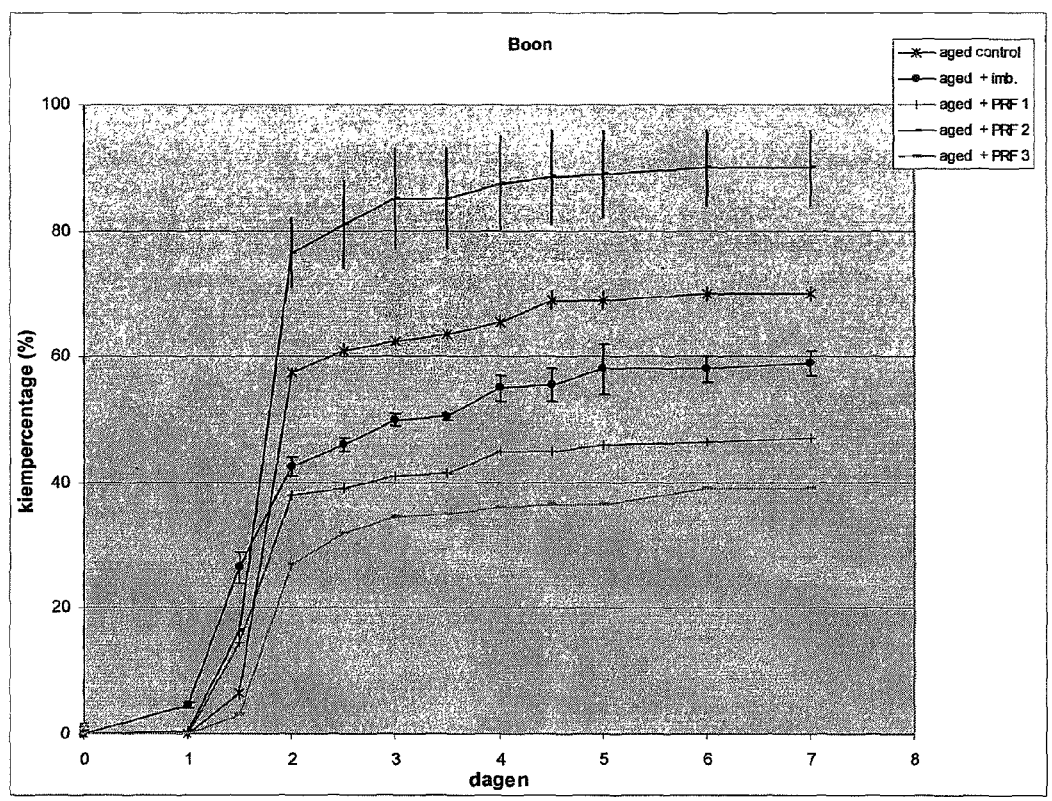
FIG. 8 is a graph of the germination rate of bean seeds. On the y-axis the percentage germination is shown, while the X-axis gives the days after sowing.
Figure 9:
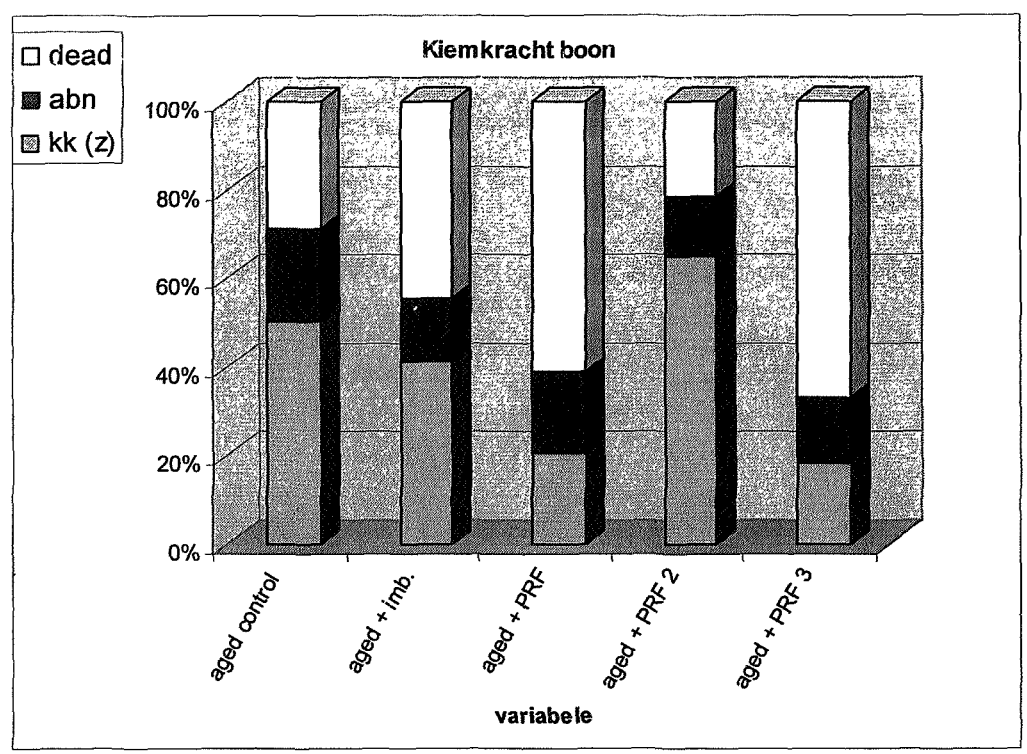
FIG. 9 demonstrates the effect of the different treatments as described in the examples on the germination of aged bean seeds. Licht gray are normal plantlets, dark grey abnormal plantlets and white are dead plantlets.

These effects were also observed in beans (Vicia faba), where we have treated physiologically aged seeds with PRF. The germination rate (total number of germinated seedlings) of physiologically aged bean seeds was significantly increased, after treatment with PRF of 30V/cm, during 20 minutes (treatment PRF2, FIGS., 8, 9 and 11). The treatments with 23V, 20 min (PRF) and 33V, 20 min (PRF2) gave impaired results as compared with the control seeds. Also, the PRF treated aged seeds showed 30% more germination than the physiological aged control (which had had exactly the same treatment, but without PRF treatment, see FIG. 8). Even in comparison with the dry, non-aged control or with the imbibed non-aged seed control, the PRF treatment induced faster germination and resulted in at least 20-50% more germinated seeds.

Moreover, an improvement of plant quality was also observed (less abnormal and dead plants), compared to the controls (physiologically aged seeds, with or without imbibition, but without PRF treatment). This shows that the PRF treatment can compensate the stress of imbibition damage in beans, in physiologically aged seeds, thus upgrading the germination rate.

Figure 10:
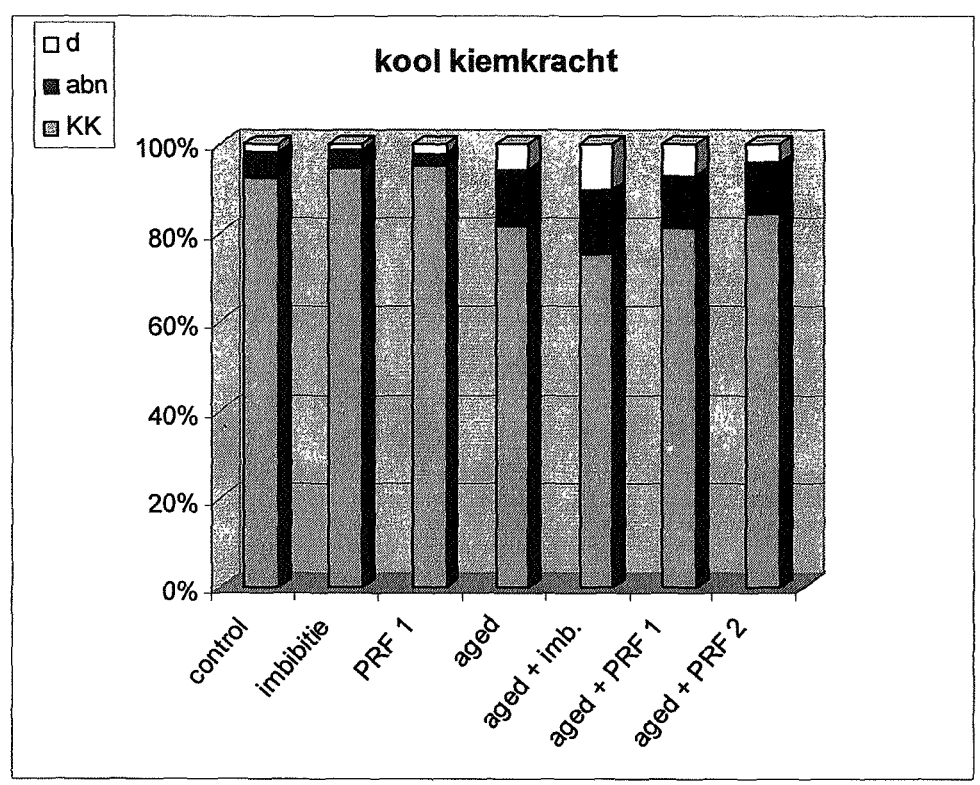
FIG. 10 demonstrates the effect of the different treatments as described in the examples on the germination of normal and aged *Brassica* seeds. Licht gray are normal plantlets, dark grey abnormal plantlets and white are dead plantlets.
Figure 11:
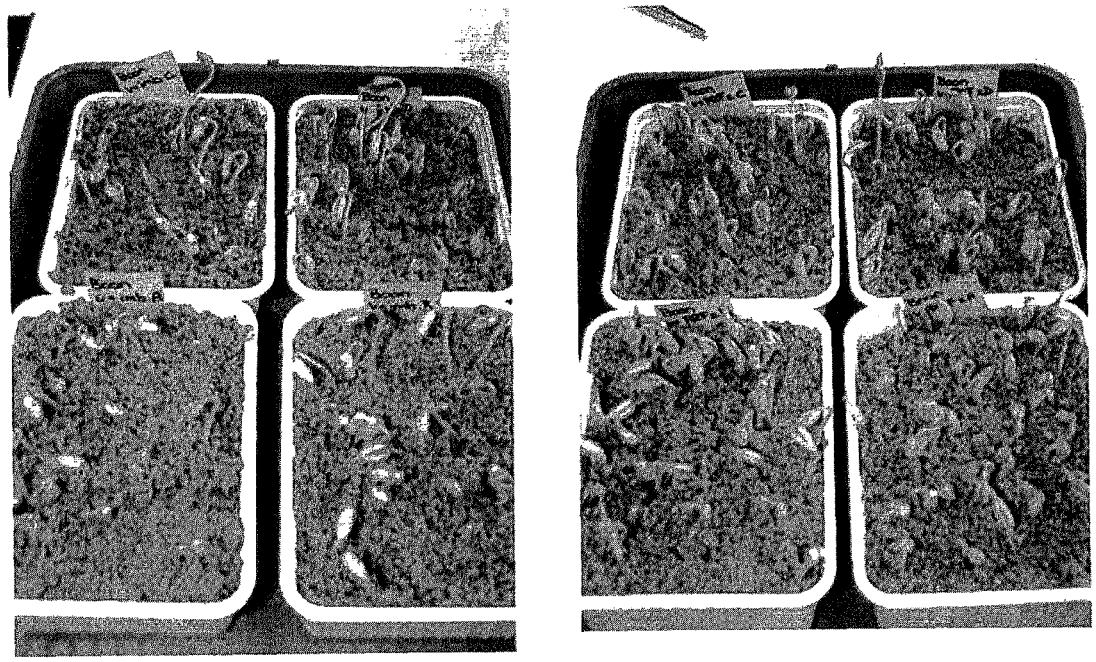
FIG. 11. Photographs of bean seeds. Left picture: 4 repeats of imbibed, non-PRF treated seeds. Right picture: 4 repeats of beans treated with PRF2 (30V, 20 min PRF).
Figure 12:
FIG. 12. Photographs of *Brassica* seeds. Left control, right PRF treated.
Figure 12:
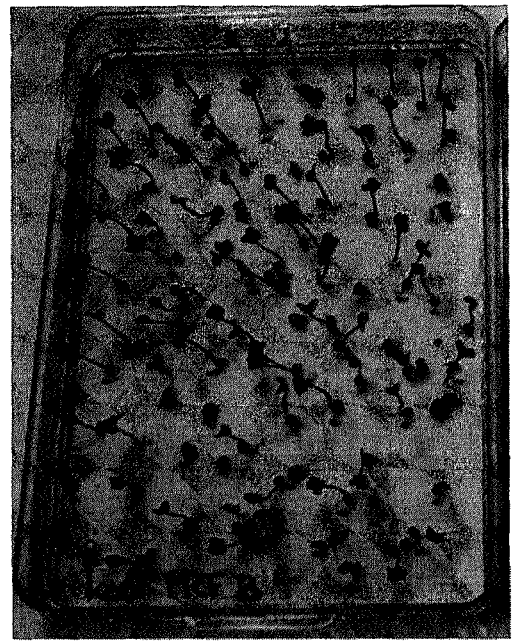

In an oilseed crop like Brassica napus (rapeseed), we have found that the percentage of abnormal plants was reduced after PRF treatment at 30V/cm during 20 minutes. This was evident in normal seeds (compare: PRF1 (23V/cm, 20 min) with control) as well as in physiologically aged seeds (compare: aged PRF2 (30V/cm, 20 min) with physiologically aged or aged imbibition, see FIGS. 10 and 12).

Moreover, the homogeneity of the plants has also been improved after this PRF treatment, in comparison with the controls. Plants were also more vigorous and have darker green leaves (see Fig. ).

TABLE I

Comparison of the PRF treatment parameters Voltage and treatment time

| Crop | BEST Voltage | Time | Second best Voltage | Time | Negative |
|---|---|---|---|---|---|
| Helianthus | 10 V/cm | 10 or 20 min | | | |
| Viola | 10 V/cm | 20 min | | | |
| Rudbeckia | 20/V | 10 min | | | |
| Geranium | 20 V | 10 min | | | |
| Zinnia | 23 V/cm | 10 min | 33 V/cm | 20 min | 30 V/30 min |
| Bellis | 15 V/cm | 30 min | 15 or 23 V/cm | 20 min | |
| Cyclamen | 15 V/cm | 20 min | | | |
| Bean | 30 V/cm | 20 min | | | 33 V/30 min |
| Wheat | 23 V/cm or 30 V | 20 min | | | |
| Rapeseed | 30 V/cm | 20 min | | | |

The invention claimed is:

1. A method to improve seeds by subjecting seeds to a pulsed radiofrequency electrical field (PRF) with the following parameters:

| | |
|---|---|
| Frequency: | 50,000-1,000,000 Hz |
| Pulse duration: | 0.1-100 msec |
| Pulse frequency: | 1-20/sec |
| Voltage: | 1-100 V per cm distance between electrodes |
| Treatment time: | 2-180 minutes | wherein said improvement comprises enhancing germination rate, and/or enhancing the germination capacity and/or increasing the homogeneity of the sprouting process, and/or increasing the vigor of plants germinated from said seeds.

2. The method of claim 1 wherein the seeds are aged seeds or seeds having an impaired germination capacity.

3. The method of claim 1, wherein seeds are primed during or before PRF treatment.

4. The method of claim 1, wherein the seeds or plant parts are placed between a plate electrode and a ground plate.

5. The method of claim 1, wherein the voltage is 5-50 V per cm.

6. The method of claim 1, wherein the treatment time is between about 5 to 60 minutes.

7. Seed treated according to the method of claim 1.

8. The method of claim 5, wherein the voltage is 10-30 V/cm.

9. The method of claim 6, wherein the treatment time is between about 10 to 30 minutes.

10. The method of claim 1, wherein the frequency is 150,000-500,000 Hz.

11. The method of claim 1, wherein the pulse duration is 5-20 msec.

12. The method of claim 1, wherein the pulse frequency is 1-3/sec.

13. The method of claim 1, wherein said seeds are of *Vigna unguiculata unguiculata, Zinnia elegans, Bellis perrenis, Cyclamen persicum, Triticum, Vicia faba*, or *Brassica napus*.

* * * * *

UNITED STATES PATENT AND TRADEMARK OFFICE
CERTIFICATE OF CORRECTION

PATENT NO. : 8,703,757 B2  Page 1 of 1
APPLICATION NO. : 12/525534
DATED : April 22, 2014
INVENTOR(S) : Sluijter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1298 days.

Signed and Sealed this

Twenty-ninth Day of September, 2015

Michelle K. Lee
*Director of the United States Patent and Trademark Office*